Jan. 26, 1937. E. M. GUYER 2,068,799
TEMPERING GLASS
Filed Sept. 2, 1933
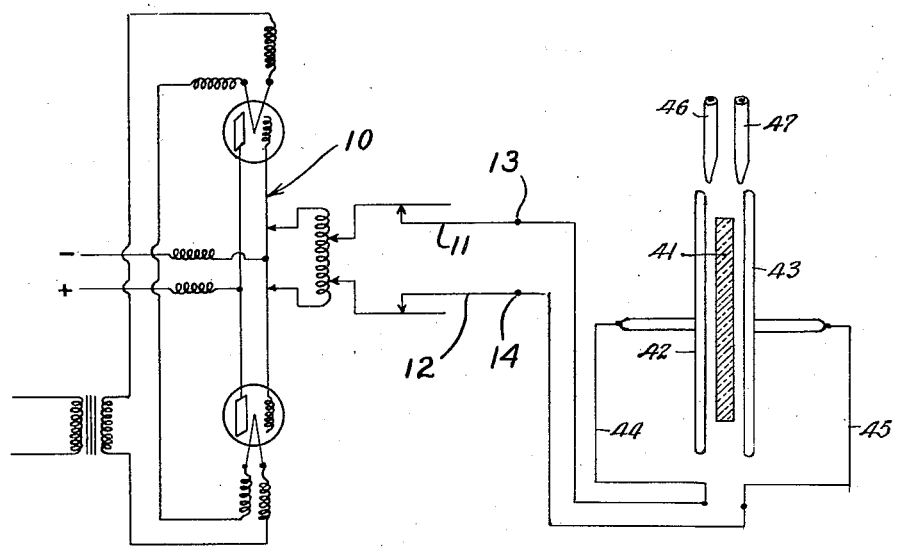
INVENTOR.
EDWIN M. GUYER
BY Dorsey & Cole
ATTORNEYS.

Patented Jan. 26, 1937

2,068,799

UNITED STATES PATENT OFFICE 2,068,799

TEMPERING GLASS

Edwin M. Guyer, Corning, N. Y., assignor to Corning Glass Works, Corning, N. Y., a corporation of New York Application September 2, 1933, Serial No. 688,021

4 Claims. (Cl. 49—79)

This invention relates to tempering glass.

Tempered glass articles are usually produced by heating a preformed glass body to a temperature lying between the strain and softening temperatures of the glass composition from which the article is made and then subjecting the heated article to a chilling operation by which the surface layers of the glass are placed under compression. The heating of the glass articles has heretofore been accomplished by subjecting the articles to radiant heat produced either by burning a fuel or from heated electrical resistance elements. When glass is heated by radiation the surface is hotter than the interior and a temperature gradient is established in the body of glass with its highest point at the surface of the glass. So far as I am aware, no method has heretofore been employed for heating glass preparatory to chilling it by which the exterior of a mass of glass was cooled while the glass was under the heating influence.

The primary object of the present invention is to establish temperatures in a glass body which decrease from the inside toward its surface.

A further object is to establish permanent strains in a body of glass by which increased resistance to thermal and mechanical shock can be produced.

The above and other objects may be accomplished by employing my invention which embodies among its features submitting the glass to be heated to the electric component of high frequency electromagnetic field which causes heating due to the high dielectric losses set up within the glass and treating the glass while it is being so heated.

In carrying my invention into practice, I employ a pair of spaced electrodes which are located at the terminals of metallic conductors leading from a high frequency source, such as an oscillator, and I support the glass to be heated between the electrodes either in or out of contact with them, though, I prefer that no contact between the electrodes and glass be made.

In the drawing:

The figure illustrates diagrammatically one type of standing wave oscillator suitable for producing high frequency current of the magnitude necessary for my purpose and showing connected thereto a pair of electrodes between which is supported the glass body to be heated and tempered.

Referring to the drawing in detail, I employ an oscillator designated generally 10, preferably of the type known as the Westinghouse standing wave oscillator, to the terminals of which I adjustably connect leads 11 and 12 which terminate in binding posts 13 and 14 respectively.

In the particular embodiment of my invention illustrated in the single figure of the drawing, the glass 41 is supported between a pair of spaced electrodes 42 and 43 which are connected by leads 44 and 45 to the binding posts 13 and 14 of the oscillator 10. By setting the oscillator 10 into operation, the glass sheet will become heated and due to heat losses from its exposed surface, the interior will become hotter than its surface. In this way it is possible to make use of the differences in temperature and viscosity within the interior and the surface of the glass so as to obtain a final condition throughout the glass of desired stress characteristics. In order to obtain a stronger glass, it is desirable that the surface be under compression and hence, I find it desirable to direct air blasts through nozzles 46 and 47 over opposite sides of the glass 41 while it is in the field between the electrodes. This has the effect of chilling the surface of the glass while its interior remains in a heated state and also rapidly removes the air between electrodes and the glass so as to avoid its breaking down through ionization.

Since by so treating a glass it is possible to effect a molecular re-adjustment by which tempering may be produced, it is obvious that my invention lends itself to many other embodiments in which it is desirable to establish a temperature gradient in a glass body such as is suitable for tempering purposes, or heating from the inside outwardly is desirable or necessary.

While in the foregoing, there has been shown and described the preferred embodiment of my invention, it is to be understood that minor changes in the details of construction, combination, and arrangement of parts may be resorted to without departing from the spirit and scope of the invention as claimed.

What I claim is:

1. The method of tempering a glass body which includes heating it by creating dielectric losses within it and cooling its surface while it is being so heated.

2. The method of tempering a glass body which includes supporting it between electrodes, creating an electromagnetic field between the electrodes to cause a heating of the glass by the dielectric losses produced in it and cooling the glass while it is being so heated.

3. The method of producing a higher temperature within the interior of a dielectric body than at its surface which includes heating the body by establishing dielectric losses through the body and dissipating the heat contained in the body adjacent its surface into the surrounding media while it is being so heated.

4. The method of tempering a glass body which includes heating the interior of the body to a greater degree than its exterior and cooling the surface of the body while it is being so heated.

EDWIN M. GUYER.